US009156453B2

(12) United States Patent
Takatsuka et al.

(10) Patent No.: US 9,156,453 B2
(45) Date of Patent: Oct. 13, 2015

(54) SADDLE TYPE VEHICLE

(71) Applicant: HONDA MOTOR CO., LTD., Tokyo (JP)

(72) Inventors: Kazuhiro Takatsuka, Wako (JP); Yoshihiro Inoue, Wako (JP); Kazuya Sawasaki, Wako (JP); Mitsuya Kawamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/314,751

(22) Filed: Jun. 25, 2014

(65) Prior Publication Data

US 2015/0041232 A1 Feb. 12, 2015

(30) Foreign Application Priority Data

Aug. 9, 2013 (JP) ................................. 2013-166713

(51) Int. Cl.
*B60T 8/1755* (2006.01)
*B60T 8/36* (2006.01)
*F02M 35/04* (2006.01)

(52) U.S. Cl.
CPC ............ *B60T 8/3685* (2013.01); *F02M 35/048* (2013.01)

(58) Field of Classification Search
CPC ............................. B60T 8/3225; B60T 8/3685
USPC ........................................................ 180/219
See application file for complete search history.

(56) References Cited

U.S. PATENT DOCUMENTS

| 4,465,322 | A | * | 8/1984 | Hayashi | 303/9.64 |
|---|---|---|---|---|---|
| 4,626,038 | A | * | 12/1986 | Hayashi et al. | 303/9.64 |
| 5,992,554 | A | * | 11/1999 | Hasumi et al. | 180/229 |
| 6,422,182 | B1 | * | 7/2002 | Ohta | 123/41.29 |
| 6,478,105 | B2 | * | 11/2002 | Okuma | 180/219 |
| 6,705,659 | B2 | * | 3/2004 | Suzuki et al. | 296/70 |
| 7,350,881 | B2 | * | 4/2008 | Asahi | 303/137 |
| 7,654,357 | B2 | * | 2/2010 | Buell et al. | 180/229 |
| 7,661,502 | B2 | * | 2/2010 | Miki et al. | 180/219 |
| 7,669,680 | B2 | * | 3/2010 | Hasegawa | 180/219 |
| 7,703,569 | B2 | * | 4/2010 | Miyabe | 180/219 |
| 7,942,484 | B2 | * | 5/2011 | Yamakura et al. | 303/137 |
| 8,002,066 | B2 | * | 8/2011 | Harada | 180/219 |
| 8,276,998 | B2 | * | 10/2012 | Tahara et al. | 303/137 |
| 8,439,455 | B2 | * | 5/2013 | Hayashi et al. | 303/137 |
| 8,651,213 | B2 | * | 2/2014 | Nagakubo et al. | 180/218 |
| 2012/0186895 | A1 | * | 7/2012 | Hamauzu et al. | 180/312 |
| 2012/0247858 | A1 | * | 10/2012 | Konno et al. | 180/219 |
| 2013/0009378 | A1 | * | 1/2013 | Nagakubo et al. | 280/274 |

FOREIGN PATENT DOCUMENTS

JP 2011-88631 A 5/2011

* cited by examiner

*Primary Examiner* — Joseph Rocca
*Assistant Examiner* — Michael Stabley
(74) *Attorney, Agent, or Firm* — Westerman, Hattori, Daniels & Adrian, LLP

(57) ABSTRACT

In a motorcycle including a vehicle body frame, an engine supported by the vehicle body frame, an air cleaner box arranged above of the engine, and an ABS module capable of decompressing brake pressures of front and rear wheels, the ABS module is arranged at a position above the engine, rearward of the air cleaner box, in proximity to the left inlet port and a right inlet port of the air cleaner box for sucking outside air, and in suction routes of the left inlet port and the right inlet port. Therefore, a cooling effect with respect to an ABS module to suppress a thermal influence on the ABS module can be secured.

10 Claims, 5 Drawing Sheets

SADDLE TYPE VEHICLE

CROSS-REFERENCE TO RELATED APPLICATIONS

The present application claims priority under 35 U.S.C. §119 to Japanese Patent Application No. 2013-166713, filed Aug. 9, 2013, the contents of which are incorporated herein, by reference, in their entirety.

TECHNICAL FIELD

The present invention relates to a saddle type vehicle.

BACKGROUND OF THE INVENTION

In recent years, in association with a reduction in size and price of antilock braking system (ABS) modules, the ABS modules are mounted on various types of motorcycles. For example, in JP-A-2011-88631, a motorcycle including an ABS module mounted thereon is disclosed. In the motor cycle disclosed in JP-A-2011-88631, a mass concentration is achieved by arranging the ABS module in an upper part of a crankcase of an engine.

SUMMARY OF THE INVENTION

In a vehicle including the ABS module mounted thereon like the motorcycle disclosed in JP-A-2011-88631, the ABS module needs to be arranged while considering a thermal influence.

A saddle type vehicle is provided including an ABS module mounted thereon, configured to suppress a thermal influence from peripheral members on the ABS module by securing a cooling effect on the ABS module.

According to a first aspect, a saddle type vehicle includes: a vehicle body frame, an engine supported by the vehicle body frame, an air cleaner box arranged above the engine; and an ABS module configured to decompress brake pressures of front and rear wheels. The ABS module is arranged at a position above the engine, rearward of the air cleaner box, in proximity to inlet ports of the air cleaner box for sucking outside air, and in suction routes of the inlet ports.

According to a second aspect, the engine is a horizontally-opposed engine, and the ABS module is arranged above cylinders of the engine at a predetermined distance in side view.

According to a third aspect, extending portions extending rearward are provided on an upper portion of the air cleaner box, the inlet ports are provided in the extending portions so as to open downward, and the ABS module is arranged below the extending portions so as to overlap with the extending portions in top view.

According to a fourth aspect, a fuel tank extending rearward and downward from above the air cleaner box. The ABS module is arranged between the fuel tank and the air cleaner box.

According to a fifth aspect, radiators are arranged sideward of the air cleaner box, surfaces of the radiators on which traveling wind flows are directed outward in a vehicle width direction, and the ABS module is arranged rearward of the radiators at a position not overlapping with the radiators.

According to the first aspect, since the ABS module is arranged in proximity to inlet ports of the air cleaner box in the suction routes of the inlet ports, outside air passes around the ABS module in association with suction of the air cleaner box. Therefore, a cooling effect with respect to the ABS module is secured, and a thermal influence from peripheral members on the ABS module is suppressed. In addition, since the ABS module is arranged above the engine, space is effectively utilized and hence a reduction in size of the vehicle is achieved.

According to the second aspect, since the ABS module is positioned above and apart from the horizontal cylinder, a thermal influence of the engine directly on the ABS module is preferably suppressed. In addition, traveling wind is allowed to flow in the space between the ABS module and the horizontal cylinder easily, and hence an improvement of a cooling effect is achieved.

According to the third aspect, since rain water or the like can hardly enter the interior of the air cleaner box from the inlet port opening downward, a water-proof property of the air cleaner box is improved. Since the extending portions and the ABS module overlap with each other in top view, outside air flows around the ABS module preferably, so that an improvement of the cooling effect is achieved.

According to the fourth aspect, a reduction in size of the vehicle is achieved by effectively utilizing the space, and an improvement of protection of the ABS module is also achieved.

According to the fifth aspect, a thermal influence of exhaust air from the radiator on the ABS module is suppressed.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
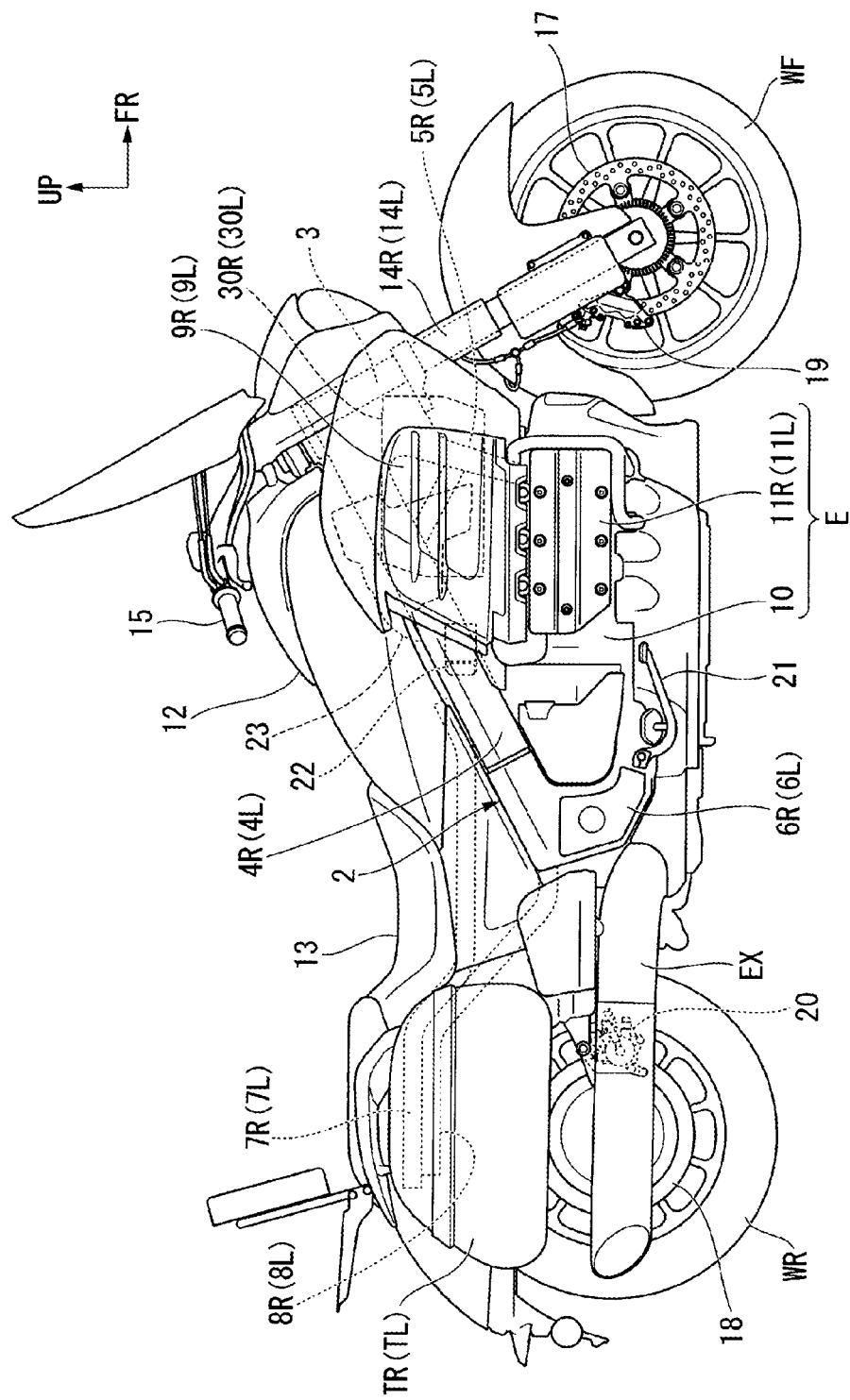
FIG. 1 is a right side view of a motorcycle according to an embodiment.

Referring now to the drawings, an embodiment of the invention will be described. In the drawings used in the following description, an arrow FR indicates the front of a vehicle, an arrow UP indicates the upper side of the vehicle, and an arrow LH indicates a left side of the vehicle, respectively.

A motorcycle 1 as a saddle type vehicle of the embodiment illustrated in FIG. 1 is a large-sized motorcycle having a horizontally-opposed six-cylinder engine E between a front wheel WF and a rear wheel WR.

The engine E is supported by a vehicle body frame 2, and the vehicle body frame 2 includes a head pipe 3 arranged at a front end for supporting a steering system, a pair of left and right main frames 4L and 4R extending rearward and downward from the head pipe 3, a pair of left and right down frames 5L and 5R extending downward from the main pipe 3 below the main frames 4L and 4R and then extending rearward, a pair of left and right pivot plates 6L and 6R extending in the vertical direction between rear ends of the main frames 4L and 4R and the down frames 5L and 5R, a pair of left and right seat rails 7L and 7R extending rearward from the rear ends of the main frames 4L and 4R, and a pair of left and right sub frames 8L and 8R extending upward from the pivot plates 6L and 6R and coupled to rear ends of the seat rails 7L and 7R.

In FIG. 1, for the sake of convenience, reference sign of the main frame 4L arranged on the left side of the vehicle body frame 2 with respect to a center in the vehicle width direction is indicated with parenthesis. Reference signs of members which will be described below may be indicated with parenthesis in the same manner.

The engine E is arranged below the main frames 4L and 4R, and is supported by the main frames 4L and 4R and the down frames 5L and 5R. The engine E includes a crankcase 10, and a left cylinder 11L and a right cylinder 11R protruding leftward and rightward respectively from the crankcase 10. The left cylinder 11L and the right cylinder 11R each include three cylinder bores arranged in a line in the fore-and-aft direction, and pistons are slidably inserted into the respective cylinder bores.

A fuel tank 12 is arranged above the main frames 4L and 4R. The fuel tank 12 extends from the front rearward and downward along the inclination of the main frames 4L and 4R, and is supported by the main frames 4L and 4R. A seat 13 on which a passenger is to be seated is arranged rearward of the fuel tank 12, and the seat 13 is supported by the seat rails 7L and 7R.

A steering system supported by the head pipe 3 includes a pair of left and right front forks 14L and 14R configured to support the front wheel WF at a lower portion thereof, and a steering handle 15 arranged on the upper side of the front forks 14L and 14R. A front end of swing arm extending in the fore-and-aft direction is rotatably supported by the pivot plates 6L and 6R, and the swing arm is configured to be pivotable in the vertical direction.

The rear wheel WR is supported at a rear end of the swing arm. However, since the swing arm is positioned inside an exhaust pipe EX, which extends in the fore-and-aft direction, in the vehicle width direction on the lower side of the vehicle, illustration is omitted. A left trunk TL is provided on the left side of the rear wheel WR and a right trunk TR is provided on the right side of the rear wheel WR.

A left radiator 30L is provided above the left cylinder 11L, and a right radiator 30R is provided above the right cylinder 11R. The left radiator 30L and the right radiator 30R are covered with a pair of left and right front side covers 9L and 9R from the outside in the vehicle width direction.

The left radiator 30L mainly cools cooling water flowing in the left cylinder 11L, and the right radiator 30R mainly cools cooling water flowing in the right cylinder 11R.

A front wheel brake disk 17 configured to rotate integrally with the front wheel WF is provided on the outer peripheral side of a hub of the front wheel WF, and a rear wheel brake disk 18 configured to rotate integrally with the rear wheel WR is provided on the outer peripheral side of a hub of the rear wheel WR.

In this embodiment, a front wheel brake caliper 19 configured to provide a braking force on the front wheel WF by clamping the front wheel brake disk 17 is provided on the front fork 14L or 14R, and a rear wheel brake caliper 20 configured to provide a braking force on the rear wheel WR by clamping the rear wheel brake disk 18 is provided on the swing arm.

A master cylinder (illustration is omitted) configured to supply a hydraulic pressure (brake pressure) for clamping to the front wheel brake calipers 19 is provided on the steering handle 15, and supplies a brake pressure to the front wheel brake caliper 19 in accordance with the operation of a brake lever (illustration is omitted) pivotably supported by the steering handle 15. The master cylinder (illustration is omitted) for supplying a hydraulic pressure (brake pressure) for clamping to the rear wheel brake caliper 20 is provided on the right pivot plate 6R, and supplies a brake pressure to the rear wheel brake caliper 20 in accordance with an operation of a brake pedal 21 pivotably supported by the right pivot plate 6R.

In the motorcycle 1, an ABS module 22 is provided between the main frames 4L and 4R, and a master cylinder for supplying a brake pressure for clamping to the front wheel brake calipers 19 is configured to supply a brake pressure to the front wheel brake calipers 19 via the ABS module 22. The master cylinder configured to supply a brake pressure for clamping to the rear wheel brake caliper 20 is also configured to supply a brake pressure to the rear wheel brake caliper 20 via the ABS module 22.

In other words, in the motorcycle 1, the ABS module 22 is provided in the course of piping connecting the front wheel brake calipers 19 and the master cylinder corresponding thereto, and the ABS module 22 is positioned in the course of piping connecting the rear wheel brake caliper 20 and the master cylinder corresponding thereto.

The ABS module 22 is configured to be capable of decompressing the brake pressure to the front wheel brake caliper 19 and the rear wheel brake caliper 20 at the time of braking of the front wheel WF or the rear wheel WR to avoid a lock upon detection thereof, and control the brake pressure to the front wheel brake caliper 19 and the rear wheel brake caliper 20 to be intermittent upon detection of the lock.

Figure 2:
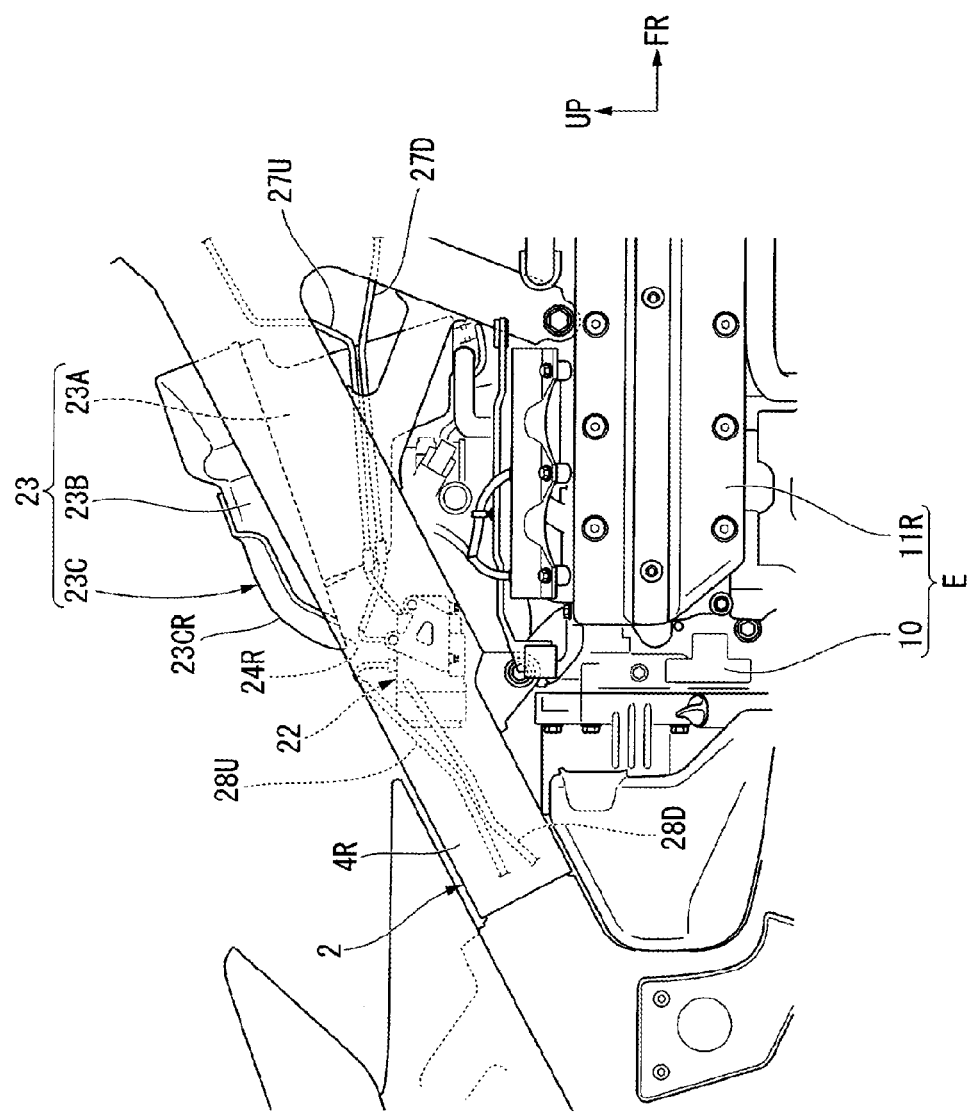
FIG. 2 is a right side view of a portion of the motorcycle.
Figure 3:
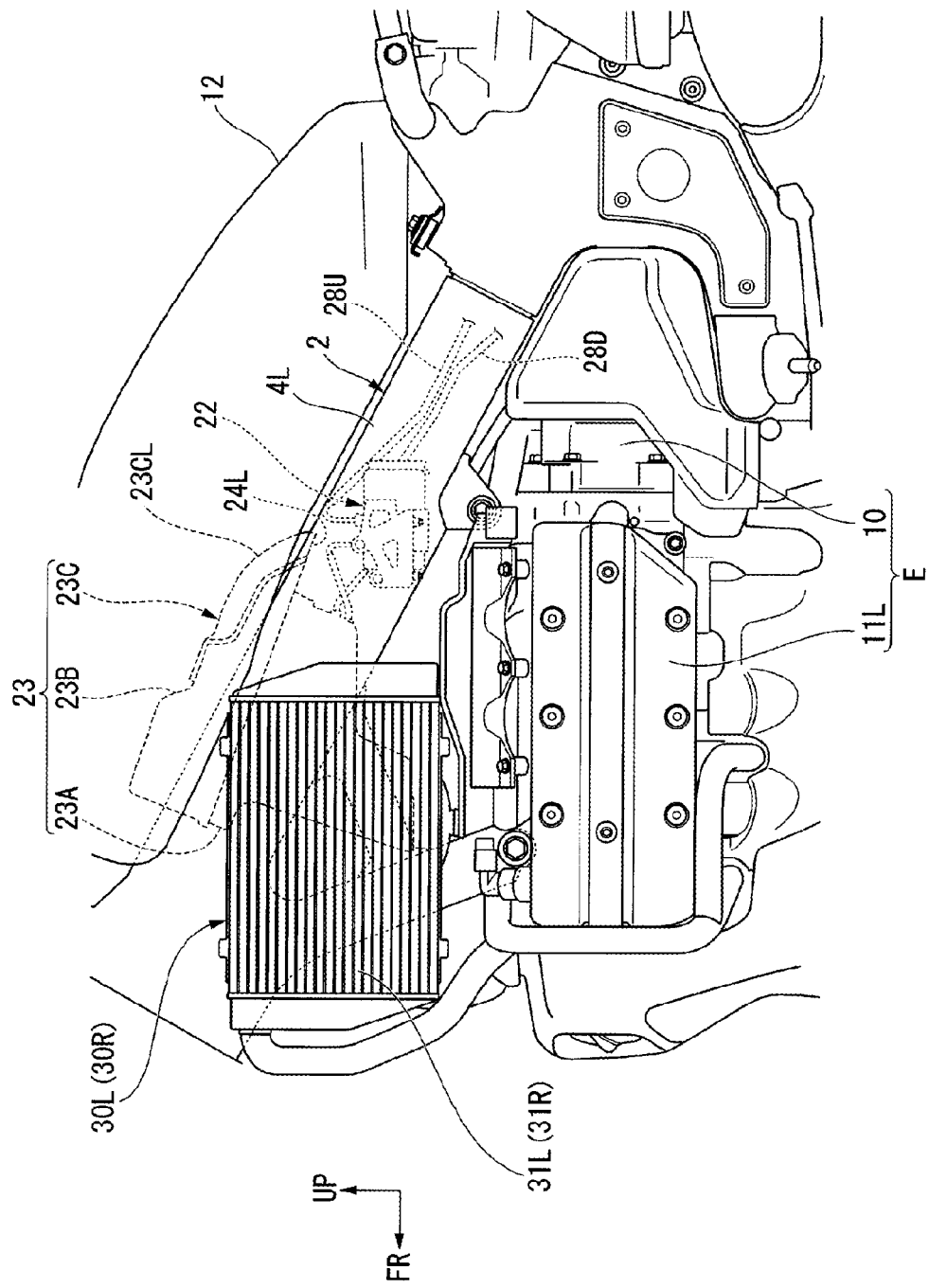
FIG. 3 is a left side view of the portion of the motorcycle.
Figure 4:
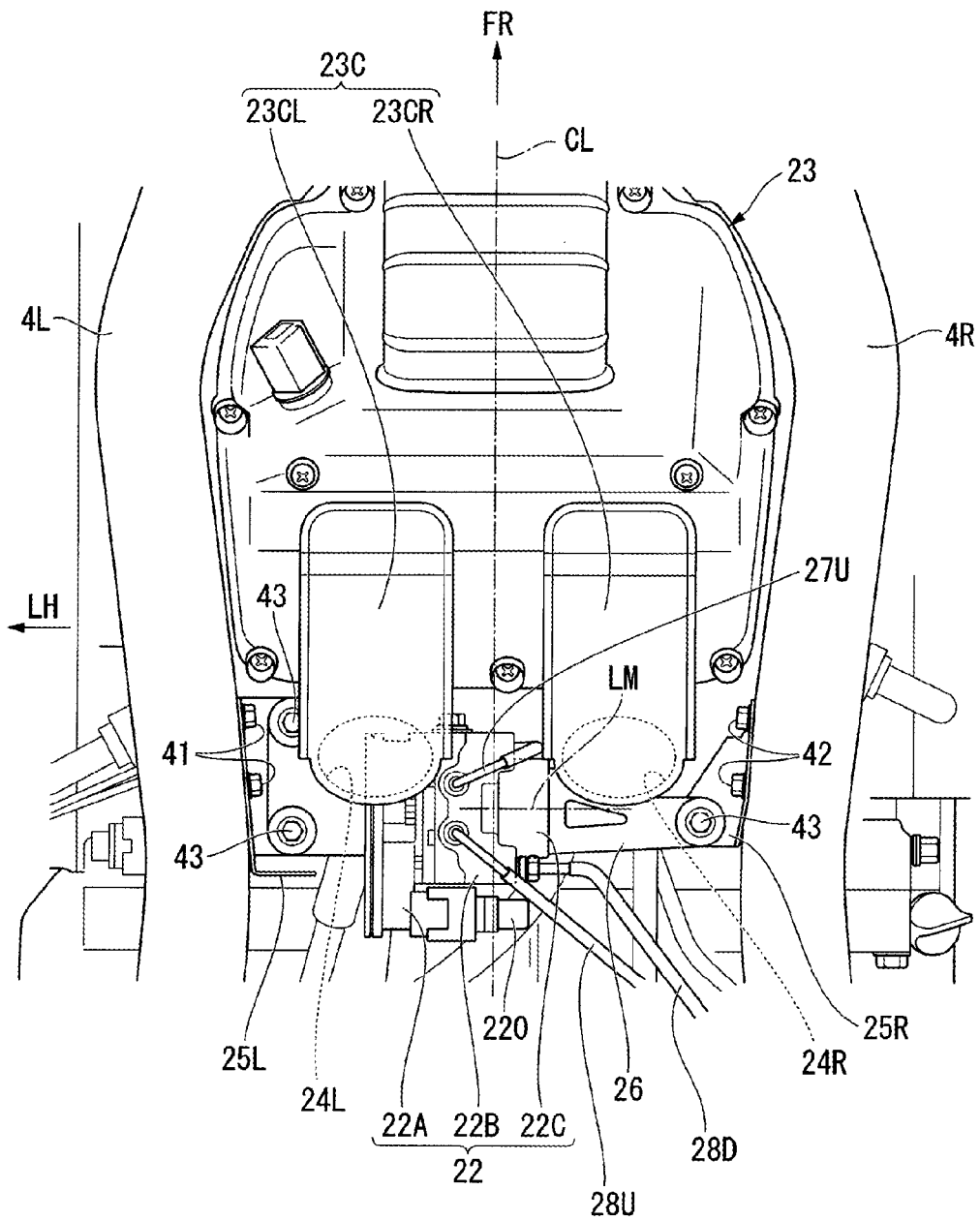
FIG. 4 is a top view of the portion of the motorcycle.

FIG. 2 is a right side view of the periphery of a position where the ABS module 22 is mounted, FIG. 3 is a left side view of the periphery of the position where the ABS module 22 is mounted, and FIG. 4 illustrates a top view of the periphery of the position where the ABS module 22 is mounted. In FIG. 2, a state in which the fuel tank 12 and the right radiator 30R are demounted is illustrated for the convenience of explanation.

In the motorcycle 1, an air cleaner box 23 is arranged between the main frames 4L and 4R above the engine E, and the ABS module 22 is arranged above the engine E and rearward of the air cleaner box 23.

Specifically, the ABS module 22 is arranged above the left and right cylinders 11L and 11R of the engine E at a predetermined distance in side view.

The air cleaner box 23 is a box member opening on top and includes a box body 23A arranged so that an opening edge thereof extends along upper surfaces of the main frames 4L and 4R in side view, a box cover 23B mounted so as to cover the opening of the box body 23A from above, and a duct portion 23C extending so as to protrude rearward from an upper portion of the rear side of the box cover 23B.

As illustrated in FIG. 4, the duct portion 23C of the air cleaner box 23 includes a left duct portion 23CL and a right duct portion 23CR in this embodiment. The left duct portion 23CL is arranged on the left side of a centerline CL in the vehicle width direction and the right duct portion 23CR is arranged on the right side of the centerline CL in the vehicle width direction. The left duct portion 23CL and the right duct portion 23CR are formed in a curved surface having an upper surface extending downward as it goes rearward in a curved shape in side view, and a lower surface extending linearly along the direction of extension of the main frames 4L and 4R in side view.

In this embodiment, a left inlet port 24L communicating with an internal space opening downward and defined by the box body 23A and the box cover 23B is provided at a rear end portion of the left duct portion 23CL, and a right inlet port 24R opening downward and communicating with the internal space opening downward and defined by the box body 23A and the box cover 23B is provided at a rear end portion of the right duct portion 23CR. The air cleaner box 23 sucks outside air from the left inlet port 24L and the right inlet port 24R, and supplies the outside air to the engine E.

Figure 5:
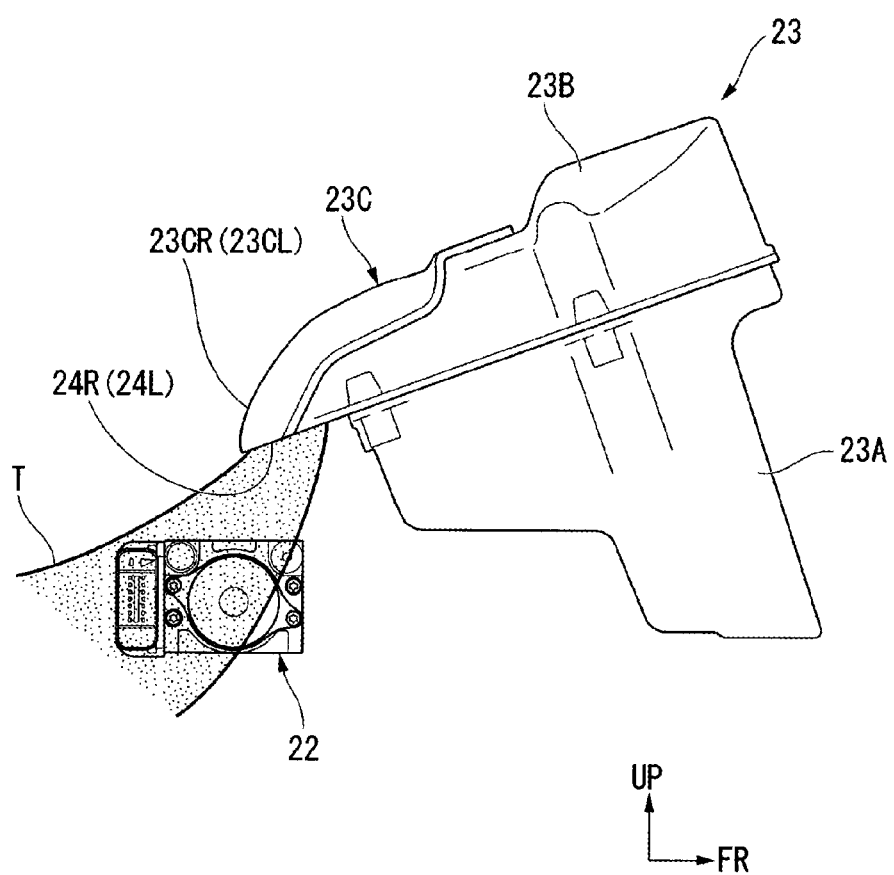
FIG. 5 is an explanatory drawing illustrating a relationship between a suction route of an air cleaner box and an ABS module provided on the motorcycle.

As illustrated in FIG. 2 and FIG. 3, the ABS module 22 is arranged in proximity to the left inlet port 24L and the right inlet port 24R from below. More specifically, the ABS module 22 is arranged in the suction routes of the left inlet port 24L and the right inlet port 24R. In FIG. 5, a suction route T outside the left inlet port 24L and the right inlet port 24R is illustrated. The suction route T is dotted for the sake of convenience of explanation.

The suction route T of the outside air sucked through the left inlet port 24L and the right inlet port 24R in association with driving of the engine E is defined so as to increase in diameter as it goes downward from the left inlet port 24L and the right inlet port 24R.

In this embodiment, the ABS module 22 is arranged in the suction route T. In other words, the ABS module 22 is arranged at a position overlapping with the suction route T. More specifically, the ABS module 22 is arranged at a position where the left inlet port 24L and the right inlet port 24R face (oppose). In FIG. 5, the left inlet port 24L, which is not fundamentally visible in the drawing, is illustrated. However, in side view, the suction route T of the left inlet port 24L is substantially overlapped with the suction route T of the right inlet port 24R, the suction routes T for the left inlet port 24L and for the right inlet port 24R are expressed in bulk as the suction route T in FIG. 5.

It is understood from FIG. 4 that the ABS module 22 is arranged so as to be biased leftward from the center in the vehicle width direction, and a portion of the ABS module 22 overlapping with the suction route T of the right inlet port 24R is larger than the portion of the ABS module 22 overlapping with the suction route T of the left inlet port 24L in this embodiment. Other positional relationships among the ABS module 22, the right inlet port 24R, and the left inlet port 24L are also applicable.

The arrangement of the ABS module 22 will be described referring to the relationship with the peripheral members. As illustrated in FIG. 4, the ABS module 22 is arranged below the left duct portion 23CL and the right duct portion 23CR and, in this embodiment, is arranged so as to overlap with the left duct portion 23CL among the left duct portion 23CL and the right duct portion 23CR, in top view.

As illustrated in FIG. 3, the ABS module 22 is arranged between a rear wall portion of the box body 23A of the air cleaner box 23 and a rear portion of the fuel tank 12 in the fore-and-aft direction. The left radiator 30L and the right radiator 30R described above are positioned on both sides (both outside in the vehicle width direction) of the air cleaner box 23, and the ABS module 22 is arranged rearward of the left radiator 30L and the right radiator 30R.

Specifically, the left radiator 30L is arranged so that a wind guide surface of a radiator core 31L having a plurality of fins arranged in parallel faces leftward, and the right radiator 30R is arranged so that a wind guide surface of a radiator core 31R faces rightward. In the left radiator 30L and the right radiator 30R, the traveling wind flows through the radiator core 31L and the radiator core 31R inward from the outside in the vehicle width direction. The ABS module 22 is arranged at a position not overlapping with the radiator core 31L and the radiator core 31R in side view.

In the following description, the configuration of the ABS module 22, the mounting structure thereof, and piping thereof will be described in detail.

As illustrated in FIG. 4, the ABS module 22 includes an electronic control unit 22A, a hydraulic circuit unit 22B arranged on the right side surface of the electronic control unit 22A, and an electric motor 22C arranged on the right side surface of the hydraulic circuit unit 22B. In the ABS module 22, when a lock is detected, a decompression control signal is input to the electronic control unit 22A. Then, the electronic control unit 22A drives the electric motor 22C to control a valve in the hydraulic circuit unit 22B. Consequently, the brake pressure is decompressed to be intermittent.

In this embodiment, the electronic control unit 22A is positioned on the left side, and the electric motor 22C is positioned on the right side. The ABS module 22 is arranged so that a drive axis line LM of the electric motor 22C extends along the vehicle width direction. In this embodiment, the electronic control unit 22A and the hydraulic circuit unit 22B of the ABS module 22 are overlapped with the left duct portion 23CL in top view.

In this embodiment, a left bracket 25L fastened to the main frame 4L on an inner surface thereof in the vehicle width direction with a plurality of bolts 41, and a right bracket 25R fastened to the main frame 4R on an inner surface thereof in the vehicle width direction with a plurality of bolts 42 are provided. An ABS bracket 26 is provided so as to extend between the left bracket 25L and the right bracket 25R, and the ABS bracket 26 is resiliently supported by the left bracket 25L and the right bracket 25R by bolts 43 (mounted with rubber). The ABS module 22 is fastened to and supported on an upper surface of the ABS bracket 26.

The ABS bracket 26 is resiliently mounted on the left bracket 25L and the right bracket 25R with both end portions thereof placed on cylindrical resilient members provided respectively on the left bracket 25L and the right bracket 25R, the bolts 43 inserted through the respective end portions passed through the resilient members so as to face downward, and nuts (illustration is omitted) tightened at lower ends of the bolts 43. Accordingly, vibrations transmitted to the ABS bracket 26 are absorbed, and hence the ABS bracket 26 is prevented from being deformed even when the vehicle body frame 2 is deflected. Consequently, a load applied to fastened portions of the ABS module 22 may be reduced.

Referring now to FIG. 2 and FIG. 4, a front wheel upstream piping 27U extending forward between the main frames 4L and 4R and connected to a master cylinder provided on the steering handle 15, and a front wheel downstream piping 27D extending forward between the main frames 4L and 4R and connected to the front wheel brake calipers 19 are connected to the hydraulic circuit unit 22B. A rear wheel upstream piping 28U extending rearward and downward between the main frames 4L and 4R and connected to a rear wheel master cylinder provided on the lower side of the vehicle, and a rear wheel downstream piping 28D extending rearward and downward between the main frames 4L and 4R and connected to the rear wheel brake calipers 20 are also connected to the hydraulic circuit unit 22B.

A coupler 220 extending rightward and positioned rearward of the hydraulic circuit unit 22B is provided on a rear portion of the electronic control unit 22A of the ABS module 22. The coupler 220 is provided for coupling harnesses for connection with an ECU, a sensor, and the like not shown in the drawing. In top view, the coupler 220 is arranged at a position not overlapping with the air cleaner box 23. In such a configuration, the mounting operation of the harness to the coupler 220 is facilitated, and the electronic control unit 22A, the hydraulic circuit unit 22B, and the electric motor 22C as heat generating members of the ABS module 22 are easily provided below the air cleaner box 28.

In the motorcycle 1 described above, the ABS module 22 is arranged above the engine E, rearward of the air cleaner box 23, in proximity to inlet ports 24L and 24R of the air cleaner box 23 for sucking outside air, and in the suction routes T of the inlet ports 24L and 24R.

Accordingly, in the motorcycle 1, outside air passes through the periphery of the ABS module 22 in association with suction of air into the air cleaner box 23, a cooling effect for the ABS module 22 is secured, and hence a thermal influence of peripheral members on the ABS module is suppressed. In addition, since the ABS module 22 is arranged above the engine E, a space is effectively utilized and hence a reduction in size or the like of the vehicle is achieved.

In the motorcycle 1 of this embodiment, since the ABS module 22 is arranged above cylinders 11L and 11R of the engine E at a predetermined distance in side view, a thermal influence of the engine applied directly on the ABS module 22 is preferably suppressed. In addition, traveling wind or the like is allowed to flow in the space between the ABS module 22 and the horizontal cylinder easily, and hence an improvement of a cooling effect is achieved.

In the motorcycle 1 of this embodiment, the ABS module 22 is arranged below the left duct portion 23CL and the right duct portion 23CR, which correspond to extending portions, and is arranged so as to overlap with the left duct portion 23CL in top view.

Accordingly, since rain water or the like can hardly enter the interior of the air cleaner box 23 due to the inlet port opening downward, a water-proof property of the air cleaner box 23 is improved. Since the left duct portion 23CL and the ABS module 22 overlap with each other in top view, outside air flows around the ABS module 22 preferably, so that an improvement of the cooling effect is achieved.

In the motorcycle 1 of this embodiment, the ABS module 22 is arranged between the fuel tank 12 and the air cleaner box 23. Therefore, the space can be effectively used to achieve a reduction in size of the vehicle, and protection of the ABS module 22 is also improved.

Furthermore, in the motorcycle 1 of this embodiment, the left radiator 30L and the right radiator 30R are arranged on both sides of the air cleaner box 23, the radiator core 31L and the radiator core 31R which correspond to surfaces on which the traveling wind of the left radiator 30L and the right radiator 30R flow, face outward in the vehicle width direction, and the ABS module 22 is arranged rearward of the left radiator 30L and the right radiator 30R in side view at a position not overlapping with the left radiator 30L and the right radiator 30R. Accordingly, a thermal influence of exhaust air from the radiator on the ABS module 22 is suppressed. In other words, the traveling wind increased in temperature by passing through the radiator flows away from the radiator, and hence hardly flows toward the ABS module 22, so that the thermal influence of discharged air can is suppressed.

Although one embodiment of the invention has been described thus far, the invention is not limited to the embodiment described above, and various modifications may be made without departing from the scope of the invention.

For example, the engine E has been described as a horizontal multi-cylinder engine in the above-described embodiment. However, parallel multi-cylinder engine or single-cylinder engine are also applicable.

In the embodiment described above, the example in which the air cleaner box 23 has two left and right inlet ports has been described. However, the number of the inlet ports may be one.

In the embodiment described above, the invention is applied to the motorcycle as a saddle type vehicle. However, the saddle type vehicle of the invention has a concept generally including vehicles to ride in a manner straddling the vehicle body. Therefore, the concept of the invention includes not only the motorcycles, but also two-wheeled and three-wheeled vehicles, and hence the invention is applicable not only to the motorcycle, but also to the three-wheeled and four-wheeled vehicles.

We claim:

1. A saddle type vehicle, comprising:
    a vehicle body frame;
    an engine supported by said vehicle body frame,
    an air cleaner box for taking in outside air, said air cleaner being disposed above said engine;
    front and rear wheels; and
    an anti-lock braking system (ABS) module configured to decompress brake pressures to at least one of said front and rear wheels,
    wherein said ABS module is disposed at a position above said engine, rearward of said air cleaner box and in proximity to at least one inlet port of said air cleaner box, such that said ABS module is disposed in a suction route of said at least one inlet port,
    wherein said air cleaner box comprises at least one extending portion which extends rearward, on an upper portion of said air cleaner box,
    wherein said at least one inlet port is provided in said at least one extending portion so as to open downward,
    wherein said ABS module is disposed below said at least one extending portion, and
    wherein said ABS module is disposed so as to overlap said at least one extending portion in top view.

2. The saddle type vehicle according to claim 1,
    wherein said engine is a horizontally-opposed engine, and
    wherein said ABS module is disposed above cylinders of said engine, in side view.

3. The saddle type vehicle according to claim 2, further comprising a fuel tank extending rearward and downward from above said air cleaner box,
    wherein said ABS module is disposed between said fuel tank and said air cleaner box.

4. The saddle type vehicle according to claim 3,
    wherein radiators are disposed on sides of said air cleaner box, surfaces of said radiators along which traveling wind flows being directed outward in a vehicle width direction, and
    wherein said ABS module is disposed rearward of said radiators, at a position not overlapping with said radiators in side view.

5. The saddle type vehicle according to claim 2,
    wherein radiators are disposed on sides of said air cleaner box, surfaces of said radiators along which traveling wind flows being directed outward in a vehicle width direction, and
    wherein said ABS module is disposed rearward of said radiators, at a position not overlapping with said radiators in side view.

6. The saddle type vehicle according to claim 1,
    wherein radiators are disposed on sides of said air cleaner box, surfaces of said radiators along which traveling wind flows being directed outward in a vehicle width direction, and
    wherein said ABS module is disposed rearward of said radiators, at a position not overlapping with said radiators in side view.

7. The saddle type vehicle according to claim 1, further comprising a fuel tank extending rearward and downward from above said air cleaner box,
    wherein said ABS module is disposed between said fuel tank and said air cleaner box.

8. The saddle type vehicle according to claim 7,
wherein radiators are disposed on sides of said air cleaner box, surfaces of said radiators along which traveling wind flows being directed outward in a vehicle width direction, and
wherein said ABS module is disposed rearward of said radiators, at a position not overlapping with said radiators in side view.

9. A saddle type vehicle, comprising:
a vehicle body frame;
an engine supported by said vehicle body frame,
an air cleaner box for taking in outside air, said air cleaner being disposed above said engine;
front and rear wheels;
an anti-lock braking system (ABS) module configured to decompress brake pressures to at least one of said front and rear wheels; and
a fuel tank extending rearward and downward from above said air cleaner box,
wherein said ABS module is disposed at a position above said engine, rearward of said air cleaner box and in proximity to at least one inlet port of said air cleaner box, such that said ABS module is disposed in a suction route of said at least one inlet port, and
wherein said ABS module is disposed between said fuel tank and said air cleaner box.

10. The saddle type vehicle according to claim 9,
wherein radiators are disposed on sides of said air cleaner box, surfaces of said radiators along which traveling wind flows being directed outward in a vehicle width direction, and
wherein said ABS module is disposed rearward of said radiators, at a position not overlapping with said radiators in side view.

* * * * *